Sept. 8, 1970     E. C. LUCKENBACH     3,527,694
FLUID SOLIDS SYSTEM
Filed Dec. 9, 1968
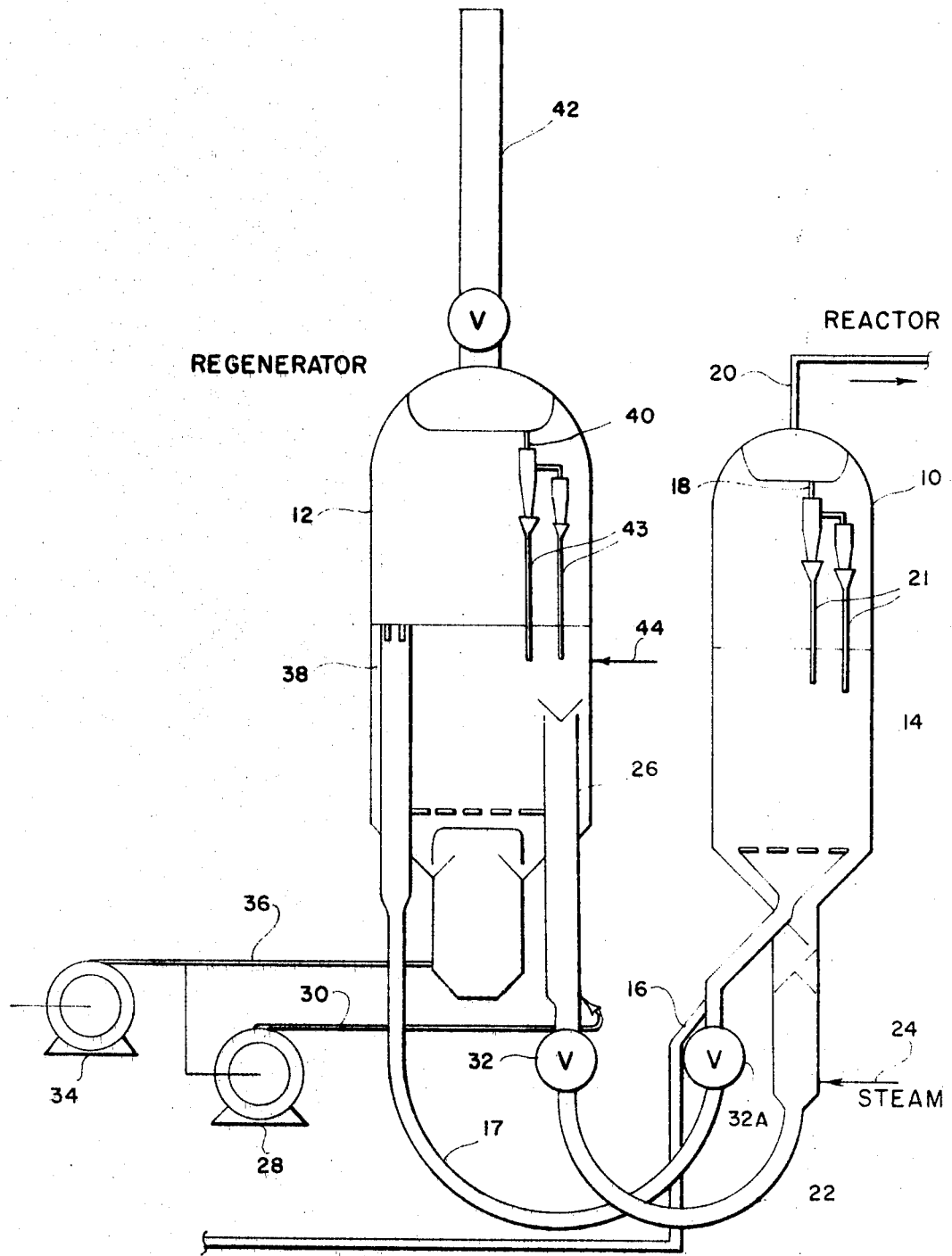
INVENTOR
EDWARD C. LUCKENBACH
BY
ATTORNEY 3,527,694
FLUID SOLIDS SYSTEM
Edward C. Luckenbach, Mountainside, N.J., assignor to Esso Research and Engineering Company, a corporation of Delaware
Filed Dec. 9, 1968, Ser. No. 782,377
Int. Cl. C10g 13/14
U.S. Cl. 208—118                    12 Claims

ABSTRACT OF THE DISCLOSURE

In a fluid solids system containing relatively coarse catalytic material and a fines content sufficient to provide good fluidity to the system, entrainment losses of fines and catalyst are reduced and fluidity is maintained by using particles having a density greater than the coarser catalytic solids in the system.

---

This invention relates to an improved fluid solids system. More particularly, the invention relates to a process for promoting and maintaining the fluidity of relatively coarse catalytic solids without excessive catalyst losses.

A fluid solids system occurs when a fluid, such as gas, flows up through a bed of small solids particles at a velocity sufficiently high to overcome the influence of gravity on the particles and to impart to the particles an appearance of great turbulence. A fluidized bed is relatively stable with vigorous and continuous contact between the fluid and the solids, resulting in rapid rates of heat and mass transfer between them.

Fluid solid systems are used successfully in numerous fields including drying processes, chemical decomposition of solid materials by heat, and catalysis of gas reactions. In the petroleum industry, in particular, the high heat and mass transfer rates obtainable from a fluidized catalyst are largely responsible for the outstanding results in the catalytic treatment of hydrocarbon vapors.

In a hydrocarbon cracking process, for example, particulate catalytic material is continuously circulated under fluid conditions between a conversion zone, where it is contacted with a hydrocarbon reactant gas and a regeneration zone where it is contacted with air or other oxygen containing gases. In the conversion zone the catalyst particles gradually become less selective to formation of desirable products because of the build-up of carbon deposits on the particles as a by-product of the conversion reaction. In the regeneration zone, the spent catalyst is regenerated by combustion of the carbon deposits. In both the reaction zone and the regeneration zone, the catalyst is maintained in a fluidized condition by flowing the gases upwardly through the catalyst mass at fluidizing velocities.

In fluidized catalytic conversion processes it is important to maintain good fluidity in the system to achieve maximum conversion of the hydrocarbons and a minimum amount of carbon deposits on the catalyst. It has been established in the past that good fluidity can be achieved by providing in the system a minimum amount of relatively fine particle size solids, generally around 15% by volume of catalytic material having a particle size less than 40 microns.

The fine particle size solids, however, are susceptible to entrainment in the gas phase reactant, resulting in a decrease in fluidity, an increase in catalyst losses, and an increase in operating cost in retaining the desired degree of fine particle size solids in the system.

For example, when the content of the fine particles, defined by the percent of particles with a diameter less than 40 microns and/or with an average particle size of about 30 microns, in a catalytic cracking reactor drops below about 6%, the fluidity of the solids system decreases, the rate of carbon deposits on the catalyst increase, and catalyst circulation problems begin to occur. In contrast, when a higher content of fine particles, generally around 15 to 20%, is maintained in the reactor, the rate of carbon deposits decreases and high catalyst circulation rates and maximum product yields can be obtained.

Previous attempts to solve entrainment loss of catalyst material have included the use of low density inert fine particle materials in place of the catalyst fine particles. The use of such fine particles, however, undesirably increases the total amount of solids, i.e., inert fine particles plus catalyst fines, lost from the system by gas entrainment even though a smaller proportion of active catalyst material is lost than in a system where the entire fines are catalytic material.

Large losses of material, however, be it active or inert, from a fluid solids system require larger, more complex solids recovery systems and can result in the introduction of deleterious material into the surrounding environment, and, as noted above, necessarily decrease the fluidity of the system.

Another problem in fluid catalyst systems is the potential for a continuing reaction resulting from the presence of entrained catalyst in the exiting reactant gas stream. Reactions occurring outside the reaction zone can produce undesirable products because of the uncontrolled conditions existing outside the zone and can result in lowered process efficiency.

Thus, while entrainment of fine solids, fluidity, reaction conditions, and product yield can be improved by the use of larger catalyst reactors and multi-stage cyclone recovery systems, such equipment is bulky and expensive to operate and maintain. Consequently, it is desirable to minimize entrainment of fine solids from a fluidized catalyst system and thereby provide more economical and more efficient catalytic reaction processes.

In accordance with the present invention, entrainment of fine particles, either inert or active, from a fluid solids system are minimized by providing in the system a fine particle size fraction in an amount and size sufficient to provide good fluidity to the system and having a density greater than the coarse catalytic materials. These dense fine particles not only provide good fluidity due to their small particle size, but they maintain the fluidity by their resistance to entrainment in the fluidizing gas.

The particle size of the dense fine particles used in the present catalytic cracking process is from about 1–40 microns, and, preferably, averages around 30 microns, and the dense fine particles comprise from about 5–40, preferably about 5 to 20% by volume of the total solids in the system.

The accompanying drawing, which is incorporated in and constitutes a part of this specification, illustrates a presently preferred embodiment of the invention, and together with the description, serves to explain the principles of the invention.

The drawing is a schematic diagram showing a fluidized catalyst system.

It is to be understood that both the foregoing general description and the following detailed description are exemplary and explanatory but are not restrictive of the invention.

An important feature of the present invention is that the fine particles incorporated in the fluid solids system are more dense than the coarse catalytic materials. These dense fine particles resist both classification by setting in the fluidizing gas stream and entrainment in the gas stream, thereby effectively enhancing and maintaining the fluidity of the system. Preferably and when used with common catalytic cracking catalysts, the fine particles have a density greater than 2.0 gm./cc.

The chemical nature of the dense fine particle material that is used in the fluid solids system of this invention can vary widely. For example, when used in a catalytic system the fine particles can be an active material that assists in the catalytic reaction in addition to enhancing fluidity or in the alternative, can be an inert material that only enhances the fluidizing properties of the catalyst solids and may assist in heat transfer between reactor and regenerator vessels. When the dense fine particles are active, they should not decompose or catalyze undesirable side reactions.

From the foregoing description, one skilled in the art can appreciate the broad scope of materials that can be used as the dense fine particle material according to the present invention. Exemplary of suitable inert materials for use in a fluid catalytic cracking system are silica sand, lava sand, fused alumina, fine ground silica or alumina particles, similar fine particles separated in an elutriative apparatus, and glass, clay, kaolin, mullite and alundum. Suitable active materials having a density greater than the catalyst include alpha alumina, eta alumina, acid activated cracking clays, montmorillonite, halloysite and the like.

By using relatively dense material for the required fine particle content in a fluid solids system, the catalytic material can be essentially coarse particles and have an average particle size as large as 100 microns. The catalytic particles in the system which comprise from about 60 to 95% by volume of the total solids, should only have a limited amount, generally below 5%, of particles below 40 microns in size. This will prevent unnecessary losses of catalyst by gas entrainment and preclude continuing reactions in the gas stream passing from the reaction zone.

The present process for controlling fluidity is especially advantageous for use in catalytic fluidized solid systems in which an expensive catalyst is used. It is possible to incorporate the active catalyst in relatively coarse particles and to use another denser material as the fine particle component having a range of particle sizes of from 0–40 microns. Because the active catalyst consists only of relatively coarse particles, the loss of active catalyst by entrainment is significantly lowered.

The addition of dense fine particles to a solid system for controlling the fluidity of the solid system permits commercial use of high pore volume catalysts (0.8 cc./gm. and higher) in continuous recirculating catalyst systems. These high pore volume catalysts, which have been available for several years, possess excellent mass transfer properties. These catalysts, however, have generally not been usable in circulating fluidized catalyst systems in which a catalyst is transferred between two or more vessels, because standpipe pressure buildups are lost in catalyst systems having the usual size distribution if the pore volume of the catalyst is above about 0.75–0.80 cc./gm. Pressure buildups in a standpipe are essential for catalyst transfer purposes in the large catalytic cracking units where the rate of circulation of solids between the vessels may amount to as much as 70 tons per minute.

By maintaining a small amount of dense fine particle material in a high pore volume catalyst system in accordance with the present method, the average particle size of the high pore volume catalyst can be increased without decreasing the fluidity of the system, and satisfactory standpipe pressure buildups can be obtained. It will be apparent that the present process for controlling fluidity of solid systems can be applied in other process situations where very high pore volume catalysts must be fluidized.

For a clearer understanding of the invention, the following examples are set forth. These examples are merely illustrative and are not intended to limit the scope and underlying principles of the invention in any way. All percentages expressed in the specification and claims are volume percentages unless otherwise indicated.

EXAMPLE 1

In this example, the present process is used to control the fluidity of a continuous cyclic system for the catalytic conversion of hydrocarbons.

With reference to the drawing, the system comprises a catalytic reactor 10 and a catalytic regenerator 12. Hydrocarbons are fed to the system through feed line 16 in the liquid or partially vaporized state, where they are mixed with regenerated catalyst in line 17 from regenerator 12 and then passed into the bottom of reactor 10 to maintain the catalyst solids in the reactor as a fluid bed 14.

Product vapors pass overhead to a gas-solids separator 18, and these vapors, when freed of entrained solid particles, are subsequently conveyed through product line 20 to a fractionator (not shown) for recovery. The entrained solid particles from separator 18 are reintroduced into bed 14 by diplegs 21.

Spent catalyst containing carbon deposits from the cracking reaction is continuously withdrawn from the bottom of reactor 10 through line 22. A steam line 24 supplies steam to strip adsorbed and occluded hydrocarbons from the spent catalyst.

Spent catalyst from line 22 enters regenerator 12 through a riser 26. An auxiliary air blower 28 supplies air through line 30 and controls the circulation rate of catalyst in line 22. Slide valves 32 and 32A are provided in each of the lines 17 and 22 to permit shut-off in case of emergency, but are not used for catalyst flow control.

In the regenerator 12, the carbonaceous materials deposited on the catalyst during the cracking reaction are removed by a controlled combustion process. Air from a main air blower 34 is introduced by line 36 into regenerator 12 to fluidize the catalyst in the regenerator and to supply oxygen for the combustion of the deposits.

Regenerated catalyst is collected in overflow well 38 and transferred to reactor 10 through line 17 by means of the lifting action of the hydrocarbon fed through line 16. Combustion gases and any entrained solids are separated in gas-solids separator system 40, the gas being transmitted to stack 42 and the solids reintroduced by diplegs 43 into the fluidized catalyst mass in regenerator 12.

A catalyst composition containing 85% by volume of alumina catalyst having an average particle size of 80 microns and a density of 1.5 gm./cc. and 15% by volume of inert, fused alumina fine particles having a density of 4.0 gm./cc. and an average particle size of 30 microns is introduced by feed line 44 into regenerator 12.

The system is then operated on a continuous basis for the catalytic conversion of hydrocarbons. Improved fluidization of the coarse catalytic particles and lower entrainment losses are visibly observed and result in greater product yield than had been previously experienced.

EXAMPLES 2–12

In the following examples, a typical 25 percent alumina equilibrium cracking catalyst having a density of 1.5 and a varying particle size distribution is introduced into the system of Example 1 together with varying amounts of inert fine particles (silica sand, lava sand, or fused alumina) having a density greater than the catalyst and a particle size distribution as shown below in Table I.

TABLE I

| Example No. | Catalyst (0-40) | Catalyst (40-80) | Catalyst (80+) | Fine Particles (20-40) | Fine Particles (15-30) | Type of Fine Particles density, gm./cc. | Fluidization |
|---|---|---|---|---|---|---|---|
| 2 | 5 | 85 | 10 | 0 | 0 | | Poor fluidization, poorer fluidization. |
| 3 | 5 | 75 | 20 | 0 | 0 | | |
| | | | | | | Silica sand | |
| 4 | 4.75 | 80.8 | 9.5 | 5 | 0 | (2.2) | Reduced entrainment and improved fluidization as Fine Particles are increased. Coarser particles are fluidized adequately. |
| 5 | 4.5 | 76.5 | 9 | 10 | 0 | (2.2) | |
| 6 | 4 | 68 | 8 | 20 | 0 | (2.2) | |
| 7 | 5 | 55 | 30 | 10 | 0 | (2.2) | |
| 8 | 4.5 | 48.5 | 27 | 20 | 0 | (2.2) | |
| | | | | | | Lava Sand | |
| 9 | 4.5 | 76.5 | 9 | 10 | 0 | (3.0) | Heavier Fine Particles give less entrainment and good fluidization. |
| | | | | | | Fused alumina | |
| 10 | 4.75 | 80.8 | 9.5 | 5 | 0 | (4.0) | Heaviest Fine Particles give lowest entrainment; high percent of Fine Particles gives best fluidity. |
| 11 | 4.5 | 76.5 | 9 | 10 | 0 | (4.0) | |
| 12 | 4 | 68 | 8 | 20 | 0 | (4.0) | |

From the above table it can be seen that when fine particles of a greater density are added to a relatively coarse catalyst, fluidization is improved and entrainment rates are lower than those which would be obtained from a fluidized catalyst that has the same overall content of catalyst fines and fine particles.

The invention in its broader aspects is not limited to the specific details shown and described, but departures may be made from such details without departing from the principles of the invention and without sacrificing its chief advantages.

What is claimed is:

1. A method for controlling the fluidity of a fluid bed of relatively coarse catalyst particles having a particle size essentially greater than 40 microns which comprises maintaining in the bed from about 5-40% by volume of relatively fine particles having a size below 40 microns and a density greater than that of the coarser catalyst particles in the bed.

2. The method of claim 1, wherein the fluid bed contains from 80-90% by volume of a relatively coarse cracking catalyst that contains less than 5% by volume of particles smaller than 40 microns.

3. The method of claim 2, wherein the catalyst is a high pore volume catalyst having a pore volume above about 0.8 cc./gm.

4. The method of claim 2, wherein the fine particles have a density above 2.0 gms./cc.

5. In a catalytic cracking process in which relatively coarse catalyst solids are maintained in a fluid bed within a reaction zone by a stream of hydrocarbon vapors and carbonaceous materials are deposited on the catalyst particles in the reaction zone, and in which the catalyst solids are continuously recirculated between the reaction zone and a regeneration zone where the spent catalyst is contacted with an oxygen-containing gas to remove the carbonaceous deposits by combustion, the improvement which comprises: maintaining in the catalyst bed from about 5 to 20% by volume of a fine particle size fraction having a particle size below 40 microns and a density greater than that of the coarser catalyst solids in the bed.

6. The process of claim 5, in which the fine particles are inert.

7. The process of claim 6, in which the fine particles are selected from the group consisting of silica sand, lava sand, fused alumina, glass, clay, kaolin, mullite, alundum, montmorillonite, halloysite, alpha alumina, eta alumina and mixtures thereof.

8. The process of claim 5, in which the density of the fine particles is above about 2.0 gm./cc.

9. The process of claim 5, in which the fine particles have an average particle size around 30 microns.

10. The process of claim 5, in which the coarser catalyst solids contain less than 5% by volume of particles smaller than 40 microns.

11. The process of claim 5, in which the coarser catalyst solids comprise a high pore volume catalyst having a pore volume above about 0.8 cc./gm.

12. The process of claim 5, in which a substantial proportion of the fine particles that are entrained from the reaction zone are collected in a solids recovery system and reintroduced into the fluidized catalyst mass in the reaction zone.

References Cited

UNITED STATES PATENTS 2,464,616  3/1949  Schwartzenbek et al. __ 208—163
2,742,403  4/1956  Nicholson et al. ____ 208—161

DELBERT E. GANTZ, Primary Examiner

A. RIMENS, Assistant Examiner

U.S. Cl. X.R.

208—161, 163, 164, 170